United States Patent [19]

Scholl et al.

[11] Patent Number: 5,712,362
[45] Date of Patent: Jan. 27, 1998

[54] PROCESS FOR THE PRODUCTION OF UV-STABLE POLYCARBONATES

[75] Inventors: Thomas Scholl, Bergisch Gladbach; Peter Bier, Krefeld, both of Germany

[73] Assignee: Bayer AG, Leverkusen, Germany

[21] Appl. No.: 513,257

[22] Filed: Aug. 10, 1995

[30] Foreign Application Priority Data

Aug. 22, 1994 [DE] Germany ............. P 44 29 697.5

[51] Int. Cl.⁶ .................................................. C08G 64/00
[52] U.S. Cl. ............... 528/196; 156/244.11; 264/116.1; 428/412; 524/86; 524/91; 524/531; 524/601; 544/132; 544/368; 546/223; 546/226; 528/198; 528/199; 528/200; 528/201
[58] Field of Search .................. 524/86, 91, 537, 524/601; 525/439; 528/196, 198, 199, 200, 201, 203; 548/261, 260; 428/412, 178; 264/176.1; 156/244.11; 544/132, 368; 546/223, 226

[56] References Cited

U.S. PATENT DOCUMENTS

| | | | |
|---|---|---|---|
| 3,214,436 | 10/1965 | Boyle et al. | 528/176 |
| 4,101,519 | 7/1978 | Hallgren | 528/197 |
| 4,707,393 | 11/1987 | Vetter | 428/178 |
| 4,853,471 | 8/1989 | Rody et al. | 548/261 |
| 5,021,521 | 6/1991 | Krabbenhoft et al. | 525/462 |

FOREIGN PATENT DOCUMENTS

| | | |
|---|---|---|
| 0 057 160 | 8/1982 | European Pat. Off. . |
| 0 338 355 | 10/1989 | European Pat. Off. . |
| 2 215 440 | 8/1974 | France . |
| 33 20 260 | 12/1984 | Germany . |
| 39 03 487 | 8/1989 | Germany . |
| 6107779 | 4/1994 | Japan . |
| 6107805 | 4/1996 | Japan . |

OTHER PUBLICATIONS

JP–61–007805 (Translation) (1996).
JP–06–107779 (Translation) (1996).
"Encyclopedia of Polymer Science and Engineering" vol. 11. pp. 649–655 (1988) 2nd Edition.
Gomez, Peter M. et al. "Functional Polymers" *Polymer Bulletin* 15, pp. 135–140 (1986).
Orbit Abstract of FR 2 215 440 (Aug. 23, 1974).
Orbit Abstract of EP 0 338 355 (Oct. 25, 1989).
Chemical Abstracts, vol. 122, No. 4, Jan. 23, 1995, Columbus, Ohio, US; abstract No. 32910, RN 21371–50–6 & JP-A-6 107 805 (Takiron Co.) Apr. 19, 1994.
Chemical Abstracts, vol. 121, No. 26, Dec. 26, 1994, Columbus Ohio, US; abstract No. 301651, RN 159043–45–5 & JP-A-6 107 779 (Mitsubishi Gas Chemical Co.) Apr. 19, 1994.
Chemical Abstracts, vol. 120, No. 10, Mar. 7, 1994, Columbus, Ohio, US; abstract No. 108473, GOSEIJUSHI, Bd. 39, Nr. 2, 1993 Japan Seiten 50–55 S. Kanayama Et Al.
Chemical Abstracts, vol. 121, No. 18, Oct. 31, 1994, Columbus, Ohio, US; abstract No. 206324, JP-A-6 145 330 (Idemitsu Petrochemical Co.) May 24, 1994.
Database WPI, Week 9531, Derwent Publications Ltd., London GB: AN 95–237230 & JP-A-7 145 246 (Takiron KK) Jun. 6, 1995.
English language translation of JP 04 05291 (Jan. 9, 1992).
Orbit Abstract of DE 33 20 260 (Dec. 6, 1984).
Orbit Abstract of DE 39 03 487 (Aug. 17, 1989).
Orbit Abstract of EP 0 057 160 (Aug. 4, 1982).
Orbit Abstract of JP 04 05291 (Jan. 9, 1992).

*Primary Examiner*—Terressa M. Mosley
*Attorney, Agent, or Firm*—Connolly & Hutz

[57] ABSTRACT

The invention relates to a process for the production of UV-stable polycarbonates, to the polycarbonates obtainable in accordance with the invention and to their use for the production of sheets, more particularly plastic panels.

10 Claims, No Drawings

PROCESS FOR THE PRODUCTION OF UV-STABLE POLYCARBONATES

This invention relates to a process for the production of UV-stable polycarbonates which is characterized in that thermoplastic aromatic polycarbonates with $\overline{M}w$ values (weight average molecular weights, as determined by light scattering) in the range from 1,500 to 250,000 and preferably in the range from 5,000 to 150,000 are reacted with compounds corresponding to formula (I):

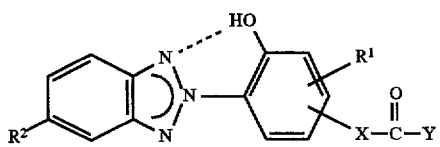

in which
$R^1$ represents H, $C_{1-18}$ alkyl, $C_{5-6}$ cycloalkyl, $C_{6-12}$ aryl,
$R^2$ represents H, Cl or $C_{1-12}$ alkyl,
X is a single bond, $C_{1-12}$ alkylene, $C_{5-6}$ cycloalkylene or phenylene and
Y is OH, O-alkali, —O—ammonium or O-(½ alkaline earth metal), in quantities of 0.01% by weight to 35% by weight, preferably in quantities of 0.1% by weight to 25% by weight and more preferably in quantities of 0.2% by weight to 15% by weight, based on 100% by weight of thermoplastic polycarbonate, 0.5 to 1.5 moles of diaryl carbonates per mole of compound (I) and optionally further quantities of diphenols and further quantities of diaryl carbonate at temperatures of 200° to 420° C., preferably at temperatures of 200° to 350° C. and more preferably at temperatures of 250° to 330° C. and under pressures of 0.01 mbar to 1,000 mbar and preferably under pressures of 0.1 mbar to 100 mbar over reaction times of a few minutes to a few hours and preferably over reaction times of 1 to 60 minutes.

The reaction is preferably carried out in the absence of catalysts, although it may also be accelerated by alkaline catalysts such as, for example, the hydroxides, carbonates, hydrogen carbonates, acetates or stearates of alkali metal or alkaline earth metals. Other suitable catalysts are nitrogen-containing basic compounds, such as tetramethyl ammonium hydroxide, or boric acid and boric acid esters, such as for example triethyl borate and triphenyl borate.

The quantity of catalyst is governed by the type and effectiveness of the catalyst and is between $1 \times 10^{-2}$ and $1 \times 10^{-9}$% by weight, based on the polycarbonate used.

The polycarbonates obtainable in accordance with the invention have a high level of UV protection which remains intact even during the processing of the polycarbonates to molded articles, more particularly doublewalled panels, under the conditions of vacuum extrusion, i.e. under reduced pressure and at elevated temperatures.

Accordingly, the UV absorbers corresponding to formula (I) are chemically fixed to the polycarbonates.

Accordingly, the present invention also relates to UV-stable polycarbonates obtainable by the process according to the invention.

It is known from U.S. Pat. No. 3,214,436 that UV absorbers corresponding to formula (I) can be added to or incorporated in alkyd resins, polyester resins, epoxy resins and polyurethane resins without the OH groups in the ortho position in the UV absorber reacting.

It is known from EP-B 0 057 160 that UV absorbers corresponding to formula (I) may be added to polycarbonates by conventional methods, for example to a melt of the polymer (see page 10, line 17 and lines 50/54 of the EP-B).

It is not apparent from EP-B 0 057 160 whether this pure addition of the UV absorbers corresponding to formula (I) to the polycarbonates (cf. page 10 of EP-B 0 057 160) leads to the chemical attachment of the UV absorber to the polycarbonates.

On the other hand, the UV absorbers corresponding to formula (I) may also be incorporated in polymers, such as lacquer binders, according to EP-B 0 057 160 (cf. page 9, line 12), for example in the synthesis of alkyd resins (Example (IV), pages 27 et seq. of the EP-B).

It is known from DE-OS 3 903 487 that weather-resistant polycarbonates can be produced by solution polymerization, chain terminators corresponding to formula (II):

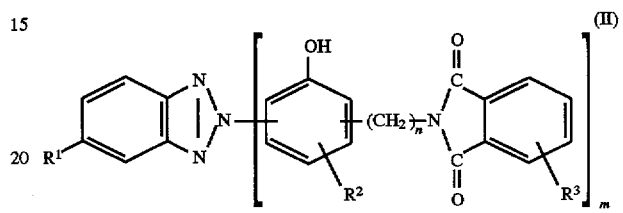

being incorporated via the OH group. Unfortunately, polycarbonates such as these have the disadvantage that the OH group crucially responsible for UV protection is no longer present in free form, but instead is bound as carbonate. Experience has shown that the protective effect is partly lost in this way. The exposure times (100 h) mentioned in DE-OS 3 903 487 are too short to be able to expect advantages to be derived therefrom in regard to practical behavior.

It is known from JA-04-05291 of 09.01.1992 that compounds corresponding to formula (III):

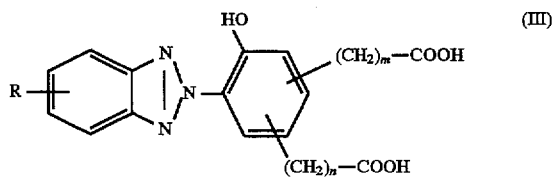

can be incorporated during the production of polymers, such as polyesters. The OH group of (III) evidently does not react in the process.

UV absorbers corresponding to formula (I) which lead to poorer polyesters are used in Comparison Examples 4, 5 and 6 of JA-04-05291.

DE-OS 3 320 260 (Le A 22 153) describes the reaction of high molecular weight polycarbonates with carboxylic acids using catalysts which leads to degradation of the polycarbonates through transesterification.

The reaction of aromatic polycarbonates with polyhydric phenols containing more than two OH groups is known from U.S. Pat. No. 5,021,521. Polycarbonates branched by transesterification are produced.

In the two last-mentioned cases, all the functional groups of the reactants of the polycarbonates react through transesterification.

The thermoplastic aromatic polycarbonates to be used as starting products in accordance with the present invention are both homopolycarbonates and copolycarbonates. The polycarbonates may be linear or branched in known manner.

The starting polycarbonates to be stabilized in accordance with the invention are produced in known manner from diphenols, carbonic acid derivatives, optionally chain terminators and optionally branching agents.

Particulars of the production of polycarbonates have been recorded in numerous patent specifications for about 40 years, cf. for example Schnell, "Chemistry and Physics of Polycarbonates", Polymer Reviews, Volume 9, Interscience Publishers, New York/London/Sydney 1964; D. Freitag, U. Grigo, P. R. Müller, H. Nonvertue, BAYER AG, "Polycarbonates" in Encyclopedia of Polymer Science and Engineering, Volume 11, Second Edition, 1988, pages 648–718 and, finally, Dres. U. Grigo, K. Kirchner and P. R. Müller "Polycarbonate" in Becker/Braun, Kunststoff-Handbuch, Vol. 3/1, Polycarbonates, Polyacetals, Polyesters, Cellulose Esters, Carl Hanser Verlag München/Wien, 1992, pages 117–299.

Diphenols suitable for the production of the polycarbonates to be stabilized in accordance with the invention are, for example, hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropyl benzenes and nucleus-alkylated and nucleus-halogenated compounds thereof.

Preferred diphenols are 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-p-diisopropyl benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methyl butane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)propane and 1,1-bis-(4-hydroxyphenyl)-3,3,5-trimethyl cyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane.

These and other suitable diphenols are described, for example, in U.S. Pat. No. 3,028,635, 2,999,835, 3,148,172, 2,991,273, 3,271,367, 4,982,014 and 2,999,846, in DE-OSS 1 570 703, 2 063 050, 2 036 052, 2 211 956 and 3 832 396, in FR-PS 1 561 518, in the book by H. Schnell entitled "Chemistry and Physics of Polycarbonates", Interscience Publishers, New York, 1964 and in published Japanese patent applications 62039/1986, 62040/1986 and 105550/1986.

In the case of the homopolycarbonates, only one diphenol is used; in the case of the copolycarbonates, several diphenols are used.

Suitable carbonic acid derivatives are, for example, phosgene or diphenyl carbonate.

Suitable chain terminators are both monophenols and monocarboxylic acids. Suitable monophenols are phenol itself, alkylphenols, such as cresols, p-tert.-butylphenol, p-n-octylphenol, p-iso-octylphenol, p-n-nonyl-phenol and p-iso-nonylphenol, halophenols, such as p-chlorophenol, 2,4-dichlorophenol, p-bromophenol and 2,4,6-tribromophenol.

Suitable monocarboxylic acids are benzoic acid, alkyl benzoic acids and halobenzoic acids.

Preferred chain terminators are phenols corresponding to formula (IV):

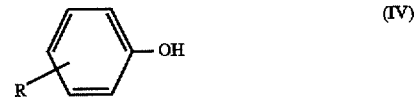

in which

R is a branched or unbranched $C_8$ and/or $C_9$ alkyl radical.

The quantity of chain terminator to be used is between 0.1 mole-% and 5 mole-%, based on moles of the diphenols used. The chain terminators may be added before, during or after the phosgenation.

Suitable branching agents are the trifunctional or more than trifunctional compounds known in polycarbonate chemistry, more particularly those containing three or more than three phenolic OH groups.

Suitable branching agents are, for example, phloroglucinol, 4,6-dimethyl-2,4,6-tri-(4-hydroxyphenyl)-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-(4',4''-dihydroxytriphenyl)-methyl)-benzene and 2,4-dihydroxybenzoic acid, trimesic acid, cyanuric chloride and 3,3-bis-(3-methyl-4-hydroxyphenyl)-2-oxo-2,3-dihydroindole.

The quantity in which the optional branching agent is used is between 0.05 mole-% and 2 mole-%, again based on moles of the diphenols used.

The branching agents may either be initially introduced with the diphenols and the chain terminators in the aqueous alkaline phase or may be added in the form of a solution in an organic solvent before the phosgenation reaction. In the case of the transesterification process, the branching agents are used together with the diphenols.

All these measures for the production of the starting polycarbonates are familiar to the expert.

The compounds corresponding to formula (I) are either known from the literature or may be obtained by methods known from the literature for example in accordance with the following reaction scheme:

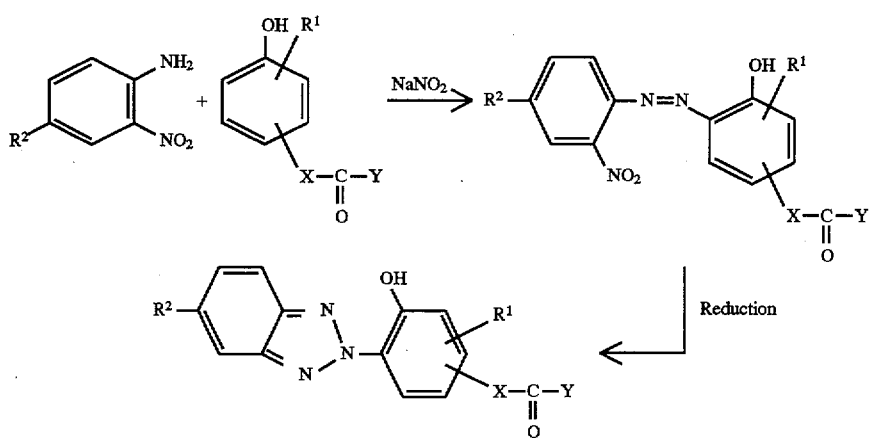

See, for example, EP-B 0 057 160, page 7.

The following are preferred compounds corresponding to formula (I):

Suitable diaryl carbonates are, for example, diphenyl carbonate and dicresyl carbonate.

The diphenols optionally used in addition correspond to those mentioned above for the production of the polycarbonates.

The polycarbonates obtainable by the process according to the invention are isolated in known manner by extruding the melt and granulating the extrudate.

The polycarbonates obtainable by the process according to the invention have average molecular weights $\overline{M}w$ (weight averages, as determined by light scattering) in the range from 1,500 to 150,000 and preferably in the range from 5,000 to 100,000.

The additives typically used for polycarbonates may be added to the polycarbonates obtainable by the process according to the invention. The polycarbonates obtainable by the process according to the invention may be molded in known manner to form various molded articles, such as films, sheets, fibers and other injection molded and extruded articles.

The UV-stabilized polycarbonates obtainable in accordance with the invention may also be used for the production of multilayer plastic panels by the (multiple) co-extrusion process, in which the supporting core layer consists, for example, of ABS, linear or branched polystyrene, preferably linear or branched polycarbonate, and the polycarbonates according to the invention containing structure (I) are applied to one or both sides of the core layer. Preferred polycarbonates obtainable in accordance with the invention contain between 1% by weight and 15% by weight of bound structures (I) and preferably between 5 and 10% by weight for this particular application.

The layer thickness of the UV-absorbing layer should be between 5 μm and 50 μm. Another outer layer substantially free from UV-absorber may be applied to the side remote from the core layer in a layer thickness of up to 30 μm.

By virtue of their high glass temperature and melt viscosity, the UV-stabilized polycarbonates obtainable in accordance with the invention show particular processing-related advantages in the last-mentioned application (coextrusion) over polycarbonates containing separately added UV absorbers of which the glass temperature and melt viscosity clearly decrease with increasing content of UV absorber. Particular significance is also attributed in this regard to the volatility and migration stability of the light stabilizers which, hitherto, have only ever been separately added. The evaporating or exuding UV absorbers can form coatings or can block the complicated extrusion nozzles, in addition to which the highly concentrated outer layer can lose UV absorber through migration of the non-fixed UV absorber in the melt, thereby losing part of its protective function. All these disadvantages can be avoided by using the internally protected polycarbonates according to the invention.

Accordingly, the present invention also relates to the use of the polycarbonates obtainable in accordance with the invention for the production of sheets, such as solid sheets and multiwalled sheets, and for the production of multilayer plastic panels, the layer thickness of the outer layer consisting of a polycarbonate obtainable in accordance with the invention containing 1% by weight to 15% by weight of terminal groups of formula (I) being from 5 to 50 μm and preferably from 20 to 40 μm.

EXAMPLES

A: UV-absorbing starting products

A1: 2-(2-Hydroxy-3-tert.butyl-5-(2-carboxyethyl)-phenyl benztriazole Mp. 195° C. (produced in accordance with EP 57 160, Example 1)

A2: 2-(2-Hydroxy-3-cyclohexyl-5-(3-carboxypropyl)-phenyl benztriazole (a) 132 g (0.75 mole) of 2-cyclohexylphenol are dissolved in 800 ml of anhydrous chlorobenzene. 200 g (1.5 moles) of $AlCl_3$ are then added at 5° to 10° C., a solution of 73.5 g (0.75 mole) of maleic anhydride in 400 ml of chlorobenzene then being introduced at 0° to 10° C. After 12 hours at room temperature, the reaction mixture is poured onto ice water and acidified with concentrated HCl. 85 g of a yellow powder melting at 187° to 190° C. are obtained.

(b) 34.5 g (0.25 mole) of o-nitroaniline are stirred into 300 ml of water and 69 ml of concentrated HCl. A solution of 17.3 g (0.25 mole) of sodium nitrite in 155 ml of water is then added dropwise at 5° C. This solution is then added dropwise at 5° C. to a solution of 68.5 g (0.25 mole) of the compound from stage A3 (a) and 79.5 g (0.75 mole) of sodium carbonate in 1 liter of water. 117 g of a brown solid melting at 155° C. are obtained.

(c) 200 ml of 2N NaOH are added to 42.5 g (0.1 mole) of the azo dye from stage A3 (b). 50 g of zinc dust are then added and 80 ml of 10N NaOH are run in over a period of 1 hour so that the temperature remains below 45° C. The reaction mixture is then heated for 4 hours to 90° C. and filtered and the filtrate is acidified with HCl. Recrystallization from cyclohexane gives 31 g of 2-(2-hydroxy-3-cyclohexyl-5-(3-carboxypropyl)-phenyl benztriazole in the form of colorless crystals melting at 165° C.

B: Production of a polycarbonate in accordance with the invention 33.9 g of compound A1, 10.7 g of diphenyl carbonate and 301 g of a linear polycarbonate based on bisphenol A with a solution viscosity of 1.28 are homogenized and heated in vacuo (0.1 nm) for 1 h to 320° C. A yellowish polymer with a relative solution viscosity of 1.18 (0.5 g in 100 ml of methylene chloride) is obtained. Where UV detection (350 nm) and UV detection (254 nm) are used, gel permeation chromatography shows that compound A1 is uniformly incorporated in the polymer.

We claim:

1. A process for the production of UV-stable polycarbonates, characterized in that thermoplastic aromatic polycarbonates with $\overline{M}w$ values (weight average molecular weights, as determined by light scattering) in the range from 1,500 to 250,000 are reacted with compounds corresponding to formula (I):

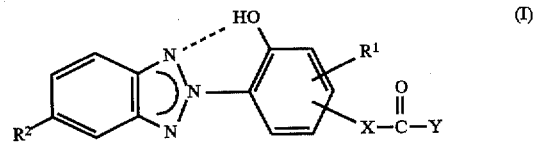

in which $R^1$ represents H, $C_{1-18}$ alkyl, $C_{5-6}$ cycloalkyl, or $C_{6-12}$ aryl, $R^2$ represents H, Cl, or $C_{1-12}$ alkyl, X is a single bond, $C_{1-12}$ alkylene, $C_{5-6}$ cycloalkylene or phenylene and Y is OH, O-alkali, —O—ammonium or O-(½alkaline earth metal), in quantities of 0.01% by weight to 35% by weight, based on 100% by weight of thermoplastic polycarbonate, and also reacted with 0.5 to 1.5 moles of diaryl carbonates per mole of compound (I) at temperatures of 200° to 420° C., under pressures of 0.01 mbar to 1,000 mbar and over reaction times of 1 to 60 minutes.

2. The process of claim 1, wherein the compounds of formula (I) are present in quantities of from 0.1% by weight to 25% by weight, based on 100% by weight of the thermoplastic polycarbonate.

3. The process of claim 1, wherein the compounds of formula (I) are present in quantities of from 0.2% by weight to 15% by weight, based on 100% by weight of the thermoplastic polycarbonate.

4. The process of claim 1, wherein the reaction temperature is from 200° to 350° C.

5. The process of claim 1, wherein the reaction temperature is from 250° to 330° C.

6. The process of claim 1, wherein the reaction pressure is from 0.1 to 100 mbar.

7. The process of claim 1, wherein the diaryl carbonates are diphenyl carbonate or dicresyl carbonate.

8. The process of claim 1, wherein the thermoplastic aromatic polycarbonates have $\overline{M}w$ values in the range from 5,000 to 150,000.

9. The process of claim 1, wherein the UV-stable polycarbonates have $\overline{M}w$ values (weight average molecular weights, as determined by light scattering) in the range from 1,500 to 150,000.

10. The process of claim 1, wherein the UV-stable polycarbonates have $\overline{M}w$ values (weight average molecular weights, as determined by light scattering) in the range from 5,000 to 100,000.

* * * * *